US012577429B2

(12) United States Patent
Ihara et al.

(10) Patent No.: US 12,577,429 B2
(45) Date of Patent: Mar. 17, 2026

(54) ADDITION-CURABLE ORGANOPOLYSILOXANE COMPOSITION, RELEASE PAPER AND RELEASE FILM

(71) Applicant: Shin-Etsu Chemical Co., Ltd., Tokyo (JP)

(72) Inventors: Toshiaki Ihara, Annaka (JP); Tsuneo Kimura, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 620 days.

(21) Appl. No.: 18/001,319

(22) PCT Filed: Jun. 3, 2021

(86) PCT No.: PCT/JP2021/021153
§ 371 (c)(1),
(2) Date: Dec. 9, 2022

(87) PCT Pub. No.: WO2021/251255
PCT Pub. Date: Dec. 16, 2021

(65) Prior Publication Data
US 2023/0250236 A1 Aug. 10, 2023

(30) Foreign Application Priority Data

Jun. 12, 2020 (JP) ................................. 2020-102033

(51) Int. Cl.
| | |
|---|---|
| *C09D 183/04* | (2006.01) |
| *C08G 77/08* | (2006.01) |
| *C08G 77/12* | (2006.01) |
| *C08G 77/20* | (2006.01) |
| *D21H 19/32* | (2006.01) |
| *D21H 27/00* | (2006.01) |
| *C09J 7/40* | (2018.01) |

(52) U.S. Cl.
CPC ........... *C09D 183/04* (2013.01); *C08G 77/08* (2013.01); *C08G 77/12* (2013.01); *C08G 77/20* (2013.01); *D21H 19/32* (2013.01); *D21H 27/001* (2013.01); *C09J 7/401* (2018.01)

(58) Field of Classification Search
CPC ..... C09D 183/04; D21H 19/32; D21H 27/001
See application file for complete search history.

(56) References Cited

U.S. PATENT DOCUMENTS

| | | | |
|---|---|---|---|
| 4,201,808 A | 5/1980 | Babian et al. | |
| 6,039,831 A | * 3/2000 | Mine | C08L 83/06 |
| | | | 524/588 |
| 2005/0075020 A1 | 4/2005 | Benayoun et al. | |
| 2007/0167563 A1 | 7/2007 | Cray et al. | |
| 2014/0010963 A1 | * 1/2014 | Brasseur | C09J 7/401 |
| | | | 427/331 |
| 2020/0332069 A1 | * 10/2020 | Li | C08G 77/20 |
| 2021/0222008 A1 | 7/2021 | Ihara et al. | |
| 2024/0117123 A1 | * 4/2024 | Ihara | C08G 77/12 |
| 2024/0158673 A1 | * 5/2024 | Yokouchi | C08G 77/12 |

FOREIGN PATENT DOCUMENTS

| | | |
|---|---|---|
| EP | 2481783 B1 | 4/2017 |
| GB | 1374792 A | 11/1974 |
| JP | S35013709 | 9/1960 |
| JP | S4732072 U | 12/1972 |
| JP | S53118453 A | 10/1978 |
| JP | S54162787 A | 12/1979 |
| JP | H0977979 A | 3/1997 |
| JP | 2005343974 A | 12/2005 |
| JP | 4221300 B2 | 11/2008 |
| JP | 2009513740 A | 4/2009 |
| JP | 2018188583 A | 11/2018 |
| WO | 2019084397 A1 | 5/2019 |
| WO | 2020004254 A1 | 1/2020 |

OTHER PUBLICATIONS

Extended European Search Report corresponding to European Application No. 21821163.9 (6 pages) (mailed Jun. 27, 2024).
English translation of International Search Report corresponding to International Patent Application No. PCT/JP2021/021153 (2 pages) (mailed Aug. 10, 2021).

* cited by examiner

*Primary Examiner* — Marc S Zimmer
(74) *Attorney, Agent, or Firm* — Myers Bigel, P.A.

(57) ABSTRACT

One of the purposes of the present invention is to provide an addition-curable organopolysiloxane composition which cures sufficiently with a minor amount of platinum group metal catalyst to exert satisfactory adhesion and provides a cured film having a release force comparable to the prior art cured film, and to provide an addition-curable organopolysiloxane composition which allows the sufficient progress of addition cure even on a substrate comprising a catalyst poison component so as to be suitable for providing a release coating for silicone rubber and release paper or release film. That is, the present invention provides an addition-curable organopolysiloxane composition comprising components (A) to (C): (A) an organopolysiloxane having two or more alkenyl groups each bonded to a silicon atom per molecule and having 0.01 to 2.9, as an average, (meth)acrylic groups, (B) an organohydrogenpolysiloxane having two or more hydrogen atoms each bonded to a silicon atom per molecule in such an amount that a ratio of the number of Si—H groups in component (B) to the number of alkenyl groups in component (A) is 1 to 5, and (C) a platinum group metal catalyst in an amount that a platinum group metal amount is 1 to 100 ppm by mass based on a total mass of the composition.

20 Claims, No Drawings

ADDITION-CURABLE ORGANOPOLYSILOXANE COMPOSITION, RELEASE PAPER AND RELEASE FILM

TECHNICAL FIELD

The present invention relates to an addition-curable organopolysiloxane composition which cures with a minor amount of platinum catalyst. More specifically, the present invention provides an addition-curable organopolysiloxane composition that provides a cured film for release paper and release film.

BACKGROUND ART

In the prior art approach for preventing adhesion or bond between sheet-like substrates such as paper and plastic sheets and pressure-sensitive adhesives, a cured film of an organopolysiloxane composition is formed on the surface of a substrate to impart release properties. The methods disclosed in Patent Literatures 1 to 3 below are known as a method for forming a cured organopolysiloxane film on the surface of a substrate.

(1) Method for forming a releasable film through an addition reaction between an alkenyl group-containing organopolysiloxane and an organohydrogenpolysiloxane in the presence of a platinum base compound catalyst (Patent Literature 1: Japanese Patent Application Laid-Open No. Sho 47-032072 (1972)).

(2) Method for forming a releasable film through a condensation reaction of an organopolysiloxane having a functional group such as hydroxy or alkoxy in the presence of an organometallic salt catalyst (Patent Literature 2: Japanese Examined Patent Publication No. Sho 35-013709 (1960)).

(3) Method for forming a releasable film by effecting radical polymerization of an acrylic group-containing organopolysiloxane using a photoinitiator and UV or an electron beam (Patent Literature 3: Japanese Patent Application Laid-Open No. Sho 54-162787 (1979)).

Among the methods, a platinum base catalyst as disclosed in Patent Literature 1 is effective in curing and can accommodate a variety of requisite release properties covering from low-speed release to high-speed release. Therefore, a platinum catalyst is widely utilized as a method for forming a releasable film through an addition reaction.

In the prior art, the amount of platinum group metal catalyst contained in the organopolysiloxane composition for release paper or release film is generally 60 to 400 ppm by mass of platinum group metal based on an amount of the composition. If the amount of the platinum catalyst is smaller than the aforesaid lower limit, a curing reaction does not proceed sufficiently, so that the cured film may become soft. In addition, the amount of residual Si—H groups increases, so that the release force becomes high. Furthermore, the unreacted raw material, organopolysiloxane, remains in the cured film and becomes a migrating component and, thereby, the organopolysiloxane migrates to the pressure-sensitive adhesive surface to be attached to release paper, possibly reducing adhesive force.

Further, the platinum group metals are expensive because they are noble metals which are rare. The platinum catalyst accounts for a large proportion of the manufacturing cost of release paper or release film. Therefore, reducing the platinum group metal catalyst leads to a lower price. Further, some substrates contain components which may be catalyst poison of the platinum group metal catalysts, such as nitrogen, sulfur, and phosphorus compounds. When the catalyst poison components bond to the platinum group metal, the progress of curing via an addition reaction may be suppressed.

Therefore, a method for forming a releasable film with a minor amount of platinum is required. For example, Patent Literatures 4 and 5 describe the following compositions.

(4) Patent Literature 4: Japanese Patent No. 4221300 describes a silicone composition comprising a polyorganosiloxane having, per molecule, at least two alkenyl groups bonded to silicon atoms, a hydrogenated organosiloxane having SiH groups at an end and on a side chain, an $MD^{Vi}Q$ resin as an adhesion-adjusting agent and an agent for inhibiting hydrosilylation, wherein M is $R_3SiO_{1/2}$, $D^{Vi}$ is $RPSiO_{2/2}$, Q is $SiO_{4/2}$, R is each independently a substituted or unsubstituted monovalent hydrocarbon group having 1 to 12 carbon atoms, which has no aliphatic unsaturation, and P is an alkenyl group represented by the formula: $—(CH_2)_n—CH=CH_2$ wherein n is an integer of 0 to 6.

(5) Patent Literature 5: Japanese National Phase Publication No. 2009-513740 describes a release coating composition comprising an alkenyl functional polysiloxane, a silicon hydride functional polysiloxane, and a platinum group metal, in which the alkenyl functional polysiloxane is prepared using a phosphazene base catalyst.

However, in the compositions disclosed in the Patent Literatures 4 and 5, curing is insufficient as will be described below.

For example, the composition disclosed in Patent Literature 4 is characterized by the use of an organosiloxane having a highly reactive terminal-SiH group and a film forming $MD^{Vi}Q$ resin. In Examples, the composition is cured by heating at 150° C. for 1.8 seconds at a platinum amount of 60 ppm. However, Patent Literature 4 does not describe a method for curing with the platinum amount of 60 ppm or less. The level of extractables (the amount of unreacted siloxane) in the film obtained by curing the composition at the platinum amount of 60 ppm is as large as 5.8% to 6.5%. Therefore, a large amount of uncured siloxane remains and curing is insufficient. Furthermore, Patent Literature 4 has no description related to release properties.

The composition disclosed in Patent Literature 5 is characterized in that the alkenyl functional polysiloxane is a branched siloxane having MDQ units. Patent Literature 5 discloses that branched chains having terminal vinyl groups increase the probability of preparing a crosslinking film. In Examples disclosed in Patent Literature 5, tetradimethylvinylsiloxysilane is reacted in the presence of a phosphazene catalyst to synthesize a branched siloxane having an alkenyl group. Following, a silicon hydride functional polysiloxane and a platinum catalyst are added to the reaction mixture in an amount to give a platinum amount of 40 ppm, and the composition is cured under the conditions at 100° C. for 15 seconds and at 115° C. for 20 seconds. In Patent Literature 5, the cured product is extracted with methyl isobutyl ketone to thereby evaluate the cured state of the composition. The proportion of the extracted unreacted siloxane is 6.4% to 25.2% and curing is insufficient. Patent Literature 5 does not describe other evaluations such as release properties.

PRIOR ART LITERATURES

Patent Literatures

Patent Literature 1: Japanese Patent Application Laid-Open No. Sho 47-032072 (1972)

Patent Literature 2: Japanese Examined Patent Publication No. Sho 35-013709 (1960)
Patent Literature 3: Japanese Patent Application Laid-Open No. Sho 54-162787 (1979)
Patent Literature 4: Japanese Patent No. 4221300
Patent Literature 5: Japanese National Phase Publication No. 2009-513740

SUMMARY OF THE INVENTION

Problems to be Solved by the Invention

In a film in which curing progressed sufficiently, the amount of unreacted siloxane extractables is generally at least 5% or less, and preferably 3% or less. If 5% or more unreacted siloxane remains on a cured film as disclosed in Patent Literatures 4 and 5, the siloxane migrates to the surface of an adhesive, resulting in a significant reduction of residual adhesion rate. Further, a large amount of the residual SiH groups are left in a cured film, the release force becomes higher compared with a cured film in which the cure proceeded sufficiently. Therefore, an organopolysiloxane composition which can be cured with a minor amount of platinum catalyst is required. However, an addition-curable organopolysiloxane composition that allows obtaining a sufficient cured film with a platinum amount of 60 ppm by mass or less is not yet known.

One of the purposes of the present invention, which has been made under the-mentioned circumstances, is to provide an addition-curable organopolysiloxane composition which cures sufficiently with a minor amount of platinum group metal catalyst to exert satisfactory adhesion and provides a cured film having a release force comparable to the prior art cured film, and to provide an addition-curable organopolysiloxane composition which allows the sufficient progress of addition cure even on a substrate comprising a catalyst poison component so as to be suitable for providing a release coating for silicone rubber and release paper or release film.

Means to Solve the Problems

The present inventors have made research to solve the aforesaid problems and found that an addition-curable organopolysiloxane composition in which an organopolysiloxane containing alkenyl groups has two or more alkenyl groups each bonded to a silicon atom per molecule and has 0.01 to 2.9, as an average, (meth)acrylic groups solves the outstanding problems and have made the present invention.

That is, the present invention provides an addition-curable organopolysiloxane composition comprising the following components (A) to (C):

(A) an organopolysiloxane having two or more alkenyl groups each bonded to a silicon atom per molecule and having 0.01 to 2.9, as an average, (meth)acrylic groups, (B) an organohydrogenpolysiloxane having two or more hydrogen atoms each bonded to a silicon atom (i.e., Si—H group) per molecule in such an amount that a ratio of the number of Si—H groups in component (B) to the number of alkenyl groups in component (A) is 1 to 5, and (C) a platinum group metal catalyst in an amount that a platinum group metal amount is 1 to 100 ppm by mass based on a total mass of the composition.

Effects of the Invention

The organopolysiloxane composition of the present invention cures sufficiently with a minor amount of platinum group metal catalyst and forms a cured film having a release force comparable to addition type compositions of the prior art. The organopolysiloxane composition of the present invention cures even under conditions that hinder curing in the prior art and allows significantly reducing manufacturing costs because of a minor amount of platinum group metal catalyst. In addition, the curing via the addition reaction is provided even on a substrate comprising a catalyst poison.

DETAILED DESCRIPTION OF THE PREFERRED EMBODIMENTS

The present invention will be described below in detail.

Component (A)

Component (A) is characterized by having two or more, preferably 2 to 50 alkenyl groups bonded to a silicon atom per molecule, and having 0.01 to 2.9, preferably 0.03 to 2.7, more preferably 0.05 to 2.5, as an average, (meth)acrylic groups. This organopolysiloxane may be a conventionally-known organopolysiloxane and may be used alone or in combination of two or more as necessary. The alkenyl group-containing organopolysiloxane has the (meth)acrylic groups within the aforesaid range and, thereby, allowing satisfactory curing with a minor amount of catalyst. Component (A) may be represented by, for example, the following average formula (1).

$$(R_3SiO_{1/2})_a(R_2PSiO_{1/2})_b(R_2ASiO_{1/2})_c(R_2SiO_{2/2})_d(RPSiO_{2/2})_e(RASiO_{2/2})_f(RSiO_{3/2})_g(PSiO_{3/2})_h (ASiO_{3/2})_i(SiO_{4/2})_j \quad (1)$$

In formula (1), R is, independently of each other, a substituted or unsubstituted monovalent hydrocarbon group having 1 to 12 carbon atoms, which has no aliphatic unsaturation, P is an alkenyl group represented by the formula: $—(CH_2)_n—CH—CH_2$ wherein n is 0 or a positive number of 0 to 6, A is a (meth)acrylic group-containing group represented by the formula: $CH_2=CR^2COR^3—$, $R^2$ is a hydrogen atom or a methyl group, $R^3$ is a divalent group that is $OR^4$ or $R^4$, and $R^4$ is a divalent organic group having 1 to 20 carbon atoms which may have a branched or cyclic structure and may contain an epoxy group, an ester bond, an urethane bond, an ether bond, an isocyanate bond, or a hydroxy group. a, b, c, e, h, i, and f are, independently of each other, 0 or a positive number. b, e, and n are not 0 at the same time and satisfy the equation $2 \leq b+e+h \leq 300$. d is a positive number of 50 to 4,000, g is 0 or a positive number of 0 to 50, j is 0 or a positive number of 0 to 50, c, f, and i are not 0 at the same time and satisfy the equation $0.01 \leq c+f++i \leq 2.9$. Preferably $0.03 \leq c+f+i \leq 2.7$, and more preferably $0.05 \leq c+f+i \leq 2.5$.

In the formula (1), R is, independently of each other, a substituted or unsubstituted monovalent hydrocarbon group having 1 to 12 carbon atoms, preferably 1 to 10 carbon atoms, more preferably 1 to 8 carbon atoms, which has no aliphatic unsaturation. More specifically, examples of the monovalent hydrocarbon group include alkyl groups such as methyl, ethyl, propyl, butyl, pentyl, hexyl, octyl, decyl, and dodecyl; cycloalkyl groups such as cyclohexyl; aryl groups such as phenyl, naphthyl, and tolyl; aralkyl groups such as benzyl and phenethyl; and those hydrocarbon groups wherein a part of the hydrogen atoms bonded to a carbon atom of these groups is substituted with halogen atoms, or an epoxy, amino, polyether, cyano or hydroxy group. Among these, 80 mol % or more of the overall R is preferably a methyl group in view of curability and reducing the release force of the cured product.

P is an alkenyl group represented by the formula: $-(CH_2)_n-CH=CH_2$ wherein n is an integer of 0 to 6. Examples of the alkenyl group include a vinyl, allyl, butenyl, propenyl, 5-hexenyl, octenyl, or decenyl group, with a vinyl group being preferred.

A is a (meth)acrylic group-containing group represented by the formula: $CH_2=CR^2COR^3-$. $R^2$ is a hydrogen atom or a methyl group, preferably a hydrogen atom. $R^3$ is a divalent group that is expressed by $OR^4$ or $R^4$, and $R^4$ is a divalent organic group having 1 to 20 carbon atoms which may have a branched or cyclic structure and may contain an epoxy group, an ester bond, an urethane bond, an ether bond, an isocyanate bond, or a hydroxy group. Examples of $R^4$ include divalent hydrocarbon groups including linear alkylene groups such as methylene, ethylene, propylene, butylene, hexamethylene, octamethylene, and decylene; branched alkylene groups such as methylethylene and methylpropylene; cyclic alkylene groups such as cyclohexylene; alkenylene groups such as propenylene; arylene groups such as phenylene; and aralkylene groups such as methylenephenylene and methylenephenylenemethylene. These divalent hydrocarbon groups may be via an ester bond, an urethane bond, an ether bond, or an isocyanate bond. A combination of the foregoing groups may also be used. In these divalent hydrocarbon groups, some or all of the hydrogen atoms may be substituted by epoxy or hydroxy groups. Among these, $R^4$ is preferably a propylene group.

In formula (1) a, b, c, e, and h are, independently of each other, 0 or a positive number. b, e, and h are not 0 at the same time and satisfy the equation $2 \leq b+e+h \leq 300$, preferably $2 \leq b+e+h \leq 10$, more preferably $2 \leq b+e+h \leq 4$. a is preferably 0 or a positive number of 1 to 4. In particular, the alkenyl group is preferably bonded to a silicon atom of an M unit or D unit, b is preferably a positive number of 1 to 6, and a+b is preferably a positive number of 2 to 10. e is preferably 0 or a positive number of 1 to 10, and h is preferably 0 or a positive number of 1 to 5.

In formula (1), c, f, and i are, independently of each other, 0 or a positive number. c, f, and i are not 0 at the same time and preferably satisfy the equation $0.01 \leq c+f+i \leq 2.9$. More preferably $0.03 \leq c+f+i \leq 2.7$, and even more preferably $0.05 \leq c+f+i \leq 2.5$. In particular, the (meth)acrylic group is preferably bonded to a silicon atom of a D unit, c and i are preferably 0, and f is preferably a positive number of 0.01 to 2.9.

In formula (1), d that indicates the number of $R_2SiO_{2/2}$ units is a positive number of 50 to 4,000, preferably a positive number of 60 to 1,000, more preferably a positive number of 70 to 300. If d is smaller than the aforesaid lower limit, a large amount of mist is generated when the coating speed becomes 200 m/min or more with the risk that the coating surface of the organopolysiloxane composition is roughened. If d is larger than the aforesaid upper limit, the organopolysiloxane composition has too high a kinetic viscosity and becomes inefficient to coat, so that the coating may be aggravated in smoothness and largely vary in coating weight locally.

In formula (1), g that indicates the number of $RSiO_{3/2}$ units is 0 or a positive number of 0 to 50, preferably 0 or a positive number of 0 to 10, more preferably 0 or a positive number of 0 to 5. j that indicates the number of $SiO_{4/2}$ units is 0 or a positive number of 0 to 50, preferably 0 or a positive number of 0 to 10, more preferably 0 or a positive number of 0 to 5.

Component (A) preferably has a vinyl value of 0.0001 to 0.7 mol/100 g, more preferably 0.005 to 0.5 mol/100 g, and even more preferably 0.01 to 0.3 mol/100 g. If the vinyl value is smaller than the aforesaid lower limit, the number of reactive sites is less, leading to a cure failure. If the vinyl value is larger than the aforesaid upper limit, the crosslinking density becomes too high, and the low-speed release force becomes too high, so that peeling may become difficult.

Component (A) preferably has a weight average molecular weight (Mw) of 3,000 to 300,000, more preferably 5,000 to 100,000, even more preferably 7,000 to 30,000, and particularly preferably 9,000 to 20,000. If the weight average molecular weight of component (A) is smaller than the aforesaid lower limit, there is a risk that the coating amount on the substrate becomes insufficient. If the weight average molecular weight is larger than the aforesaid upper limit, there is a risk that working becomes inefficient. The weight average molecular weight may be determined by, for example, $^{29}$Si-NMR measurement using deuterated chloroform as a measuring solvent or gel permeation chromatography (GPC) reduced to polystyrene standards and using toluene solvent (the same holds true, hereinafter).

Component (A) preferably has a viscosity at 25° C. of 10 mPa·s or more as determined by a rotational viscometer and a 30 wt % toluene solution viscosity (i.e., a viscosity of a 30 wt % solution of organopolysiloxane in toluene) of 70,000 mPa·s or less, more preferably a viscosity of 50 mPa·s or more and a 30 wt % toluene solution viscosity of 60,000 mPa·s or less. If the viscosity is smaller than 10 mPa·s, there is a risk that the coating weight becomes insufficient. If the 30 wt % toluene solution viscosity is larger than 70,000 mPa·s, there is a risk that working becomes inefficient.

In the organopolysiloxane (A) of the present invention, the alkenyl group and the (meth)acrylic group may be bonded at a molecular chain end or on a side chain. The (meth)acrylic group is preferably on a side chain, and in particular, it is preferred that the (meth)acrylic group is bonded to a silicon atom of the D unit directly or via a hydrocarbon. In particular, the (meth)acrylic group is preferably only on a side chain. The alkenyl group is preferably bonded to a silicon atom of the M unit or D unit. Examples of component (A) include siloxanes comprising alkenyl groups at both ends and (meth)acrylic groups on side chains, siloxanes comprising alkenyl groups on side chains and (meth)acrylic groups on side chains, siloxanes comprising alkenyl groups at one end and on side chains and (meth) acrylic groups on side chains, siloxanes comprising alkenyl groups at both ends and on side chains and (meth)acrylic groups on side chains, and branched siloxanes comprising alkenyl groups at ends and (meth)acrylic groups on side chains.

More specifically, examples of organopolysiloxane (A) include siloxanes having the following structures:

$M^{Vi}_2D_dD^A_f$,
$M_2D_dD^{Vi}_eD^A_f$,
$M^{Vi}_3D_dD^A_fT_1$,
$M^{Vi}_4D_eD^A_fT_2$,
$M^{Vi}_2D_dD^{Vi}_eD^A_f$,
$M^{Vi}_2D_dD^{Vi}_eD^A_fQ_1$,
$M^A_2D_dD^{Vi}_eD^A_f$, or
$M^A_2M_1D_dD^{Vi}_eD^A_fT_1$.

Even more specifically, examples include siloxanes having the following structures:

$M^{Vi}_2D_{100}D^A_{0.01}$,
$M^{Vi}_2D_{150}D^A_{0.05}$,
$M^{Vi}_2D_{200}D^A_{0.1}$,
$M^{Vi}_2D_{300}D^A_{2.5}$,
$M^{Vi}_3D_{200}D^A_{0.1}$, or
$M^{Vi}_2D_{200}D^A_{0.5}Q_1$.

Herein, M is $R_3SiO_{1/2}$, $M^{Vi}$ is $R_2PSiO_{1/2}$, D is $R_2SiO_{2/2}$, $D^{Vi}$ is $RPSiO_{2/2}$, $D^A$ is $RASiO_{2/2}$, T is $RSiO_{3/2}$, and Q is $SiO_{4/2}$. R, A, and P are as described above.

Component (B)

Component (B) is an organohydrogenpolysiloxane having two or more hydrogen atoms each bonded to a silicon atom (i.e., Si—H group) per molecule, but having no (meth) acrylic group, which may be used alone or in combination of two or more as necessary. An addition reaction is conducted between Si—H groups on the organohydrogenpolysiloxane and alkenyl groups on component (A) to form a crosslinked organopolysiloxane.

Component (B) preferably has 3 to 100, more preferably 10 to 100 hydrogen atoms bonded to a silicon atom (i.e., Si—H group) per molecule. The content of Si—H groups is preferably 0.001 to 3.5 mol/100 g, more preferably 0.01 to 2.5 mol/100 g, even more preferably 0.02 to 2.0 mol/100 g. There is a risk that a lower Si—H group content adversely affects curability and adhesion of compositions. An excessive content may cause tightening of a release force.

The organohydrogenpolysiloxane (B) is preferably represented by the following formula (2).

$$(R'_3SiO_{1/2})_m(R'_2HSiO_{1/2})_n(R'_2SiO_{2/2})_o(R'HSiO_{2/2})_p$$
$$(RSiO_{3/2})_q(HSiO_{3/2})_r(SiO_{4/2})_s \qquad (2)$$

In formula (2), R' is, independently of each other, a substituted or unsubstituted monovalent hydrocarbon group having 1 to 12 carbon atoms, which has no aliphatic unsaturation. m, n, o, and q are, independently of each other, 0 or a positive number, p is a positive number of 0 to 100, r is a positive number of 0 to 10, s is a positive number of 0 to 10, n, p, and r are not equal to 0 at the same time, and $2 \leq n+p+r \leq 100$.

In the formula (2), R' is, independently of each other, a substituted or unsubstituted monovalent hydrocarbon group having 1 to 12 carbon atoms, preferably 1 to 10 carbon atoms, more preferably 1 to 8 carbon atoms, which has no aliphatic unsaturation. Examples include alkyl groups such as methyl, ethyl, propyl, butyl, pentyl, hexyl, octyl, decyl, and dodecyl; cycloalkyl groups such as cyclohexyl; aryl groups such as phenyl, naphthyl, and tolyl; aralkyl groups such as benzyl and phenethyl; and substituted forms of the foregoing in which some carbon-bonded hydrogen atoms are substituted by halogen atoms, epoxy, amino, polyether, cyano or hydroxy groups. Among these, methyl preferably accounts for 80 mol % or more of the overall R' in view of keeping the composition curable and reducing the release force of the cured product.

In formula (2), m, n, o, and q are, independently of each other, 0 or a positive number, m is preferably 0 or a positive number of 1 to 10, n is preferably 0 or a positive number of 1 to 10, and m+n is preferably a positive number of 2 to 12. o is preferably 0 or a positive number of 1 to 100, and q is preferably 0 or a positive number of 1 to 10. Also, p is a positive number of 0 to 100, preferably a positive number of 2 to 100, and more preferably a positive number of 10 to 80. r is a positive number of 0 to 10, preferably 0 or a positive number of 1 to 5, and s is a positive number of 0 to 10, preferably 0 or a positive number of 1 to 5. n, p, and r are not equal to 0 at the same time, and n+p+r is a positive number of 3 to 100, preferably a positive number of 10 to 80.

Examples of the organohydrogenpolysiloxane (B) include siloxanes comprising hydrogensilyl groups at both ends, siloxanes comprising hydrogensilyl groups on side chains, siloxanes comprising hydrogensilyl groups at one end and on side chains, and siloxanes comprising hydrogensilyl groups at both ends and on side chains.

More specifically, examples include organohydrogen-polysiloxanes having the following structures:

$M^H_2D_o$,
$M_2D^H_p$,
$M_2D_oD^H_p$,
$M^H_2D_oD^H_p$,
$M^H_3D_oT_1$,
$M^H4D_oT_2$, or
$M_mD_oD^H_pT^H_r$.

Even more specifically, examples include organohydrogenpolysiloxanes having the following structures:

$M^H_2D_{10}$,
$M^H_2D_{100}$,
$M_2D^H_{80}$,
$M_2D_{27}D^H_3$,
$M_2D_{97}D^H_3$,
$M_2D_{26}D^H_4$,
$M_2D_{25}D^H_5$,
$M_2D_{24}D^H_6$,
$M_2D_{96}D^H_4$,
$M_2D_{95}D^H_5$,
$M^H_3D_{100}T_1$,
$M^H_4D_{100}T_2$,
$M^H_2D_{97}D^H_1$,
$M^H_2D_{95}D^H_3$,
$M_3D_{93}D^H_3T^H_1$,
$M_2D^H_{30}$, or
$M_2D^H_{60}$.

In each of the formulas, M is $R'_3SiO_{1/2}$, $M^H$ is $R'_2HSiO_{1/2}$, D is $R'_2SiO_{2/2}$, DH is $R'HSiO_{2/2}$, T is $R'SiO_{3/2}$, and $T^H$ is $HSiO_{3/2}$. R' is as described above.

Component (B) preferably has a weight average molecular weight (Mw) of 194 to 10,000, more preferably 874 to 5,000. If the Mw is smaller than the aforesaid lower limit, the adhesion of the composition may be noticeably deteriorated. If the Mw is larger than the aforesaid upper limit, there is a risk that reactivity becomes poor, and curability becomes low, resulting in a reduction of residual adhesion rate or an increase of release force due to under-curing.

Component (B) preferably has a kinetic viscosity at 25° C. of 2 to 500 $mm^2/s$, more preferably 2 to 300 $mm^2/s$, even more preferably 5 to 200 $mm^2/s$ as determined by an Ostwald viscometer. If the kinetic viscosity at 25° C. is smaller than 2 $mm^2/s$, the adhesion to substrates may be deteriorated despite good reactivity due to a low molecular weight. If the kinetic viscosity is larger than 500 $mm^2/s$, reactivity may become poor, and curability may become low, resulting in a reduction of residual adhesion rate or an increase of release force due to under-curing.

The amount of component (B) is such that a ratio of the number of Si—H groups in component (B) to the number of alkenyl groups in component (A) is 1 to 5, preferably 1.2 to 3. If the amount of component (B) is too less, curability and adhesion of the composition become insufficient. If the amount of component (B) is too much, the amount of residual Si—H groups increases, so that the release force becomes high. Further, the amount of Si—H groups decreases with time, so that the release force significantly varies with time.

Component (C)

As the platinum group metal catalyst (C), any well-known addition reaction catalysts may be used. Examples of the platinum group metal catalyst include platinum, palladium, rhodium, and ruthenium base catalysts. Among these, the platinum base catalysts are particularly preferred. Examples of the platinum base catalyst include platinum base compounds, such as platinum-silica-alumina, platinum-alumina-halogen, and platinum-rhodium, complexes of platinum with vinyl siloxanes, alcohol or aldehyde solutions of chloroplatinic acid, complex salts of chloroplatinic acid with olefins, and complexes of chloroplatinic acid with vinyl siloxanes.

The amount of component (C) may be a catalytic amount. The amount of platinum group metal for providing a cured film for release paper or release film is typically 60 to 500 ppm by weight in an organopolysiloxane composition. In contrast to this, the amount of the platinum group metal catalyst is 1 to 100 ppm by mass of platinum group metal based on the total mass of the present composition. The amount is preferably 3 to 60 ppm by mass, more preferably 5 to 40 ppm by mass, and most preferably 10 to 30 ppm by mass. The organopolysiloxane composition of the present invention is sufficiently cured even with a minor amount of platinum group metal catalyst and provides a cured film having satisfactory physical properties. If the amount of the catalyst is smaller than the aforesaid lower limit, an addition reaction does not proceed well, and many unreacted functionalities remain. Therefore, a sufficient cured film is not formed. If the amount of the catalyst is larger than the aforesaid upper limit, the composition may react with water or an inhibitor or may cure during work with a shortened usable time.

Component (D)

The organopolysiloxane composition of the present invention may contain an addition reaction inhibitor (D) as necessary. The addition reaction inhibitor serves to control the catalytic activity of the platinum group metal catalyst and may be a conventionally-known inhibitor. Examples of the addition reaction inhibitor include organonitrogen compounds, organophosphorus compounds, acetylene compounds, oxime compounds, and organic chlorine compounds. More specifically, examples include acetylene alcohols such as 1-ethynyl-1-cyclohexanol, 3-methyl-1-butyn-3-ol, 3,5-dimethyl-1-hexyne-3-ol, 3-methyl-1-pentyne-3-ol, and 2-phenyl-3-butyn-2-ol, acetylene compounds such as 3-methyl-3-penten-1-yne and 3,5-dimethyl-3-hexene-1-yne, reaction products of acetylene compounds with alkoxysilanes, siloxanes, or hydrogensilanes, e.g., 1,1-dimethylpropynyloxytrimethylsilane, vinylsiloxanes such as cyclic tetramethylvinylsiloxanes, organonitrogen compounds such as benzotriazole and other organophosphorus compounds, oxime compounds, maleic acid compounds such as diallyl maleate, and organic chlorine compounds.

The amount of component (D) is preferably 0.01 to 5 parts by mass, more preferably 0.1 to 3 parts by mass, relative to 100 parts by mass of component (A). When the amount is in this range, an addition cure reaction is satisfactory controlled. If the amount is less than the aforesaid lower limit, there is a risk of cure to happen during work due to a shortened usable time. If the amount is larger than the aforesaid upper limit, an addition reaction does not proceed well, so that a cured film may not be formed.

Other Components

In the organopolysiloxane composition of the present invention, other than the components (A) to (D), any of other components which are comprised in conventional addition-curable compositions for release paper or release film may be comprised as long as the benefits of the present invention are not impaired. Examples of other components include an organic solvent, high-molecular-weight linear organopolysiloxanes other than components (A) to (C) for imparting lubricity, aryl group-containing silicone resins other than components (A) to (C) for adjusting release force, silicone resins, and silica.

The organic solvent is preferably organic solvents (exclusive of siloxane solvents) in which organopolysiloxanes are soluble such as toluene, hexane, xylene, and methyl ethyl ketone (also known as 2-butanone), and organopolysiloxanes (or siloxane solvents) including low-viscosity cyclic siloxanes such as octamethyltetrasiloxane and decamethylpentasiloxane, linear siloxanes such as $M_2D_t$ wherein M and D are as defined above in the formula (1), and t is a number of 0 to 200, preferably a number of 1 to 50, and branched siloxanes such as $M_{2+u}D_tT_u$ wherein M, D, and T are as defined above in the formula (1), t is 0 to 200, preferably 1 to 50, and u is 1 to 10, preferably 1 to 3.

The amount of the organic solvent is preferably 3 to 50 times, more preferably 8 to 30 times the total mass of component (A) and component (B).

The organopolysiloxane composition of the present invention is obtained by mixing predetermined amounts of components (A) to (C) and if necessary, component (D) and optional components. The resulting organopolysiloxane composition preferably has a kinetic viscosity at 25° C. of 10 to 2000 $mm^2/s$, more preferably 15 to 1000 $mm^2/s$ as determined by an Ostwald viscometer.

Various substrates are coated with the organopolysiloxane composition of the present invention, and the composition is cured to provide release paper and a release film. For example, a sheet-like substrate such as paper or a plastic film is coated with the organopolysiloxane composition by means of a coating roll (e.g., a three-roll mill, a five-roll mill, a gravure roll, an offset gravure roll, etc.), and the composition is heat cured in a standard manner. Accordingly, the sheet-like substrate having a cured silicone film formed on one surface is obtained such as release paper and a release sheet.

Examples of paper substrates include glassine paper, polyethylene-laminated paper, polyvinyl alcohol resin-coated paper, and clay-coated paper. Examples of plastic film substrates include films of polyethylene, polypropylene, and polyesters such as polyethylene terephthalate.

The coating amount of the organopolysiloxane composition onto a substrate may be sufficient to form a cured silicone film on the surface of a sheet-like substrate, for example, about 0.1 to 5.0 $g/m^2$. An excessive coating amount may rather cause a reduction in release performance. Although the heat curing conditions vary depending on the type of substrate and the coating amount, a cured film may be formed on a substrate by heating at 80 to 200° C., preferably 100 to 180° C. for 1 to 60 seconds, preferably 2 to 30 seconds.

EXAMPLES

The present invention will hereinafter be described more specifically by the Examples and the Comparative Examples but the present invention is not limited by the Examples.

In the following description, the weight average molecular weight, Mw, is determined by $^{29}Si$-NMR using deuterated chloroform as a measuring solvent, the viscosity (mPa·s) is determined at 25° C. by a rotational viscometer, and the kinetic viscosity (mm²/s) is determined at 25° C. by an Ostwald viscometer.

Each component used in Examples and Comparative Examples is as described below.

Component (A)

In the following description, M represents $R_3SiO_{1/2}$, $M^{Vi}$ represents $R_2PSiO_{1/2}$, D represents $R_2SiO_{2/2}$, $D^{Vi}$ represents $RPSiO_{2/2}$, $D^A$ represents $RASiO_{2/2}$, and T represents $RSiO_{3/2}$. R represents a methyl group, and P represents a vinyl group.

1) Methyl polysiloxane (1) having two vinyl groups per molecule and having 0.05, as an average, acrylic group, which is represented by the following average formula:

$$M^{Vi}{}_2D_{150}D^A{}_{0.05}$$

wherein A is $CH_2$=$CHCO(CH_2)_3$—, the vinyl value is 0.0177 mol/100 g, and the viscosity is 413 mPa·s. The Mw is 11294.6.

2) Methyl polysiloxane (2) having two vinyl groups per molecule and having 0.1, as an average, acrylic group, which is represented by the following average formula:

$$M^{Vi}{}_2D_{150}D^A{}_{0.1}$$

wherein A is $CH_2$=$CHCO(CH_2)_3$—, the vinyl value is 0.0177 mol/100 g, and the viscosity is 415 mPa·s. The Mw is 11303.2.

3) Methyl polysiloxane (3) having two vinyl groups per molecule and having 2.5, as an average, acrylic groups, which is represented by the following average formula:

$$M^{Vi}{}_2D_{220}D^A{}_{2.5}$$

wherein A is $CH_2$=$CHCO(CH_2)_3$—, the vinyl value is 0.0118 mol/100 g, and the viscosity is 1082 mPa·s. The Mw is 16896.

4) Methyl polysiloxane (4) having two vinyl groups per molecule and having 1, as an average, acrylic group, which is represented by the following average formula:

$$M^{Vi}{}_3D_{150}D^A{}_1T_1$$

wherein A is $CH_2$=$CHCO(CH_2)_3$—, the vinyl value is 0.0258 mol/100 g, and the viscosity is 258 mPa·s. The Mw is 11618.

5) Methyl polysiloxane (5) having two vinyl groups on side chains and having 0.1, as an average, acrylic group, which is represented by the following average formula:

$$M_2D^{Vi}{}_2D_{148}D^A{}_{0.1}$$

wherein A is $CH_2$=$CHCO(CH_2)_3$—, the vinyl value is 0.0174 mol/100 g, and the viscosity is 418 mPa·s. The Mw is 11303.2.

(6) Methyl polysiloxane (6) having two vinyl groups per molecule and having 0.1, as an average, methacrylic group, which is represented by the following average formula:

$$M^{Vi}{}_2D_{150}D^A{'}{}_{0.1}$$

wherein A' is $CH_2$=$C(CH_3)CO(CH_2)_3$—, the vinyl value is 0.0177 mol/100 g, and the viscosity is 416 mPa·s. The Mw is 11304.6.

Component (B)

Methylhydrogenpolysiloxane (7) represented by the following average formula:

$$M_2D^H{}_{100}$$

wherein M is $R'_3SiO_{1/2}$, and $D^H$ is $R'HSiO_{2/2}$ and R' is a methyl group. The methylhydrogenpolysiloxane has trimethylsiloxy groups at both ends of the molecular chain. The Si—H group content is 1.62 mol/100 g, and the kinetic viscosity is 35 mm²/s. The Mw is 6162.

Other Additive Components (Comparative Examples)

(1) Methyl polysiloxane (8) having vinyl groups at both ends, but no (meth)acrylic group, which is represented by the following average formula:

$$M^{Vi}{}_2D_{150}$$

wherein $M^{Vi}$ is $R_2PSiO_{1/2}$, D is $R_2SiO_{2/2}$, R is a methyl group, P is $CH_2$=$CH$—, the vinyl value is 0.0177 mol/100 g, and the viscosity is 405 mPa·s. The Mw is 11286.

2) Methyl polysiloxane (9) having two vinyl groups per molecule and having 10, as an average, acrylic groups, which is represented by the following average formula:

$$M^{Vi}{}_2D_{150}D^A{}_{10}$$

wherein $M^{Vi}$ is $R_2PSiO_{1/2}$, D is $R_2SiO_{2/2}$, $D^A$ is $RASiO_{2/2}$, R is a methyl group, A is $CH_2$=$CHCO(CH_2)_3$—, P is $CH_2$=$CH$—, the vinyl value is 0.0154 mol/100 g, and the viscosity is 427 mPa·s. The Mw is 13006.

(3) Methyl polysiloxane (10) having acrylic groups at both ends, which is represented by the following average formula:

$$M^A{}_2D_5$$

wherein $M^A$ is $R_2ASiO_{1/2}$, D is $R_2SiO_{2/2}$, R is a methyl group, A is $CH_2$=$CHCO(CH_2)_3$—, and the viscosity is 7 mPa·s. The Mw is 728.

Example 1

Each components were mixed in the formulation described in Table 1 below to prepare an addition-curable organopolysiloxane composition.

That is, 100 parts by mass of the (A) methyl polysiloxane (1) was mixed with 1.97 parts by mass of the (B) methylhydrogenpolysiloxane (7) and 0.3 part by mass of (D) 1-ethynyl-1-cyclohexanol, and they were stirred until to be uniform. Afterwards, the (C) platinum-vinylsiloxane complex was added in such an amount as to give 20 ppm by mass of platinum atom based on the total mass of the composition and the mixture was stirred until to be uniform. The product obtained was the organopolysiloxane composition having a kinetic viscosity of 393 mm²/s. A ratio of the number of Si—H groups in component (B) to the number of alkenyl groups in component (A), hereinafter described as H/Vi, was 1.8.

Example 2

The procedures in Example 1 were repeated, except that 100 parts by mass of the methyl polysiloxane (2) was used as component (A) as described in Table 1, to obtain an organopolysiloxane composition having a kinetic viscosity of 395 mm²/s and a H/Vi of 1.8.

Example 3

The procedures in Example 1 were repeated, except that 100 parts by mass of the methyl polysiloxane (3) as component (A) and 1.97 parts by mass of the methylhydrogenpolysiloxane (7) as component (B) were used as described in Table 1, to obtain an organopolysiloxane composition having a kinetic viscosity of 1035 mm²/s and a H/Vi of 1.8.

Example 4

The procedures in Example 1 were repeated except that 100 parts by mass of the methyl polysiloxane (4) as component (A) and 2.87 parts by mass of the methylhydrogenpolysiloxane (7) as component (B) were used as described in Table 1, to obtain an organopolysiloxane composition having a kinetic viscosity of 244 mm²/s and a H/Vi of 1.8.

Example 5

The procedures in Example 1 were repeated, except that 100 parts by mass of the methyl polysiloxane (5) as component (A) and 1.639 parts by mass of the methylhydrogenpolysiloxane (7) as component (B) were used as described in Table 1, to obtain an organopolysiloxane composition having a kinetic viscosity of 398 mm²/s and a H/Vi of 1.8.

Example 6

The procedures in Example 1 were repeated, except that 50 parts by mass of the methyl polysiloxane (3), 50 parts by mass of the methyl polysiloxane (8) as component (A) and 1.51 parts by mass of the methylhydrogenpolysiloxane (7) as component (B) were used as described in Table 1, to obtain an organopolysiloxane composition having a kinetic viscosity of 646 mm²/s and a H/Vi of 1.8.

Example 7

The procedures in Example 1 were repeated, except that 100 parts by mass of the methyl polysiloxane (6) as component (A) was used as described in Table 1, to obtain an organopolysiloxane composition having a kinetic viscosity of 396 mm²/s and a H/Vi of 1.8.

Example 8

The procedures in Example 1 were repeated, except that the (C) platinum-vinylsiloxane complex was used in such an amount as to give 15 ppm by mass of platinum atom based on the total mass of the composition as described in Table 1, to obtain an organopolysiloxane composition having a kinetic viscosity of 395 mm²/s and a H/Vi of 1.8.

Comparative Example 1

The procedures in Example 1 were repeated, except that 100 parts by mass of the methyl polysiloxane comprising vinyl groups at both ends (8) was used instead of component (A) as described in Table 1, to obtain an organopolysiloxane composition having a kinetic viscosity of 386 mm²/s and a H/Vi of 1.8.

Comparative Example 2

The procedures in Example 1 were repeated, except that 100 parts by mass of the methyl polysiloxane comprising vinyl groups at both ends and acrylic groups on side chains (9) was used instead of component (A) and the amount of the (B) methylhydrogenpolysiloxane (7) was changed to 1.71 parts by weight as described in Table 2, to obtain an organopolysiloxane composition having a kinetic viscosity of 408 mm²/s and a H/Vi of 1.8.

Comparative Example 3

The procedure in Comparative Example 1 were repeated, except that 1 part by weight of organopolysiloxane having acrylic groups at both ends: $M^4_2D_5$ (10) was further added to the formulation of the Comparative Example 1 as described in Table 2, to obtain an organopolysiloxane composition having a kinetic viscosity of 388 mm²/s and a H/Vi of 1.8.

Comparative Example 4

The procedure in Comparative Example 1 were repeated, except that 1 part by weight of acrylic acid (11) was further added to the formulation of the Comparative Example 1 as described in Table 2, to obtain an organopolysiloxane composition having a kinetic viscosity of 393 mm²/s and a H/Vi of 1.8.

Reference Example 1

As described in Table 2, similarly to Comparative Example 1, 100 parts by mass of methyl polysiloxane comprising vinyl groups at both ends (8), 1.97 parts by mass of (B) methylhydrogenpolysiloxane (7) having a H/Vi of 1.8, and 0.3 part by mass of 1-ethynyl-1-cyclohexanol as component (D) were mixed and stirred until to be uniform. Afterwards, the (C) platinum-vinylsiloxane complex was added in such an amount as to give 100 ppm by mass of platinum atom based on the total mass of the composition, and the mixture was stirred until to be uniform.

The product obtained was an organopolysiloxane composition having a kinetic viscosity of 387 mm²/s.

Each of the organopolysiloxane compositions obtained above was evaluated by each of the following tests. The results are shown in Tables 1 to 4.

Release Force

A metal roll of an RI tester (ex IHI Machinery and Furnace Co., Ltd.) was coated with the organopolysiloxane composition, the composition was uniformly stretched by rotating two rolls for 45 seconds. Then, the composition was transferred from a rubber roll to glassine paper ASP (ex Ahlstrom-Munksjo, comprising a catalyst poison). The glassine paper having the organopolysiloxane composition transferred thereto was heated in a hot air dryer at 120° C. for 30 seconds to obtain a release paper bearing a cured film having a thickness of 0.9 to 1.1 g/m². After aging at 25° C. for 24 hours in this state, TESA-7475 tape (tesa UK Ltd.) was attached to the cured film surface of the release paper (the side transferred from the rubber roll), which was cut to a size of 2.5 cm by 18 cm. This test piece was sandwiched between glass plates, and aged at 25° C. under a load of 70 g/cm², at 70° C. under a load of 20 g/cm², and at room temperature for 24 hours. After the aging, an end of the test piece was detached, and an end portion of the substrate of the tape was pulled at a peeling speed of 0.3 m/min at an angle of 180° relative to the glassine paper. During that time, a force (i.e., "release force") (N/25 mm) required to peel the tape off was determined by a tensile tester (model AGS-50G by Shimadzu Corporation).

Residual Adhesion Rate

The TESA-7475 tape after the determination of the release force was attached to a polyester film and pressed by rolling back and forth a roller of 2 kg once. The assembly was allowed to stand for 30 minutes, an end of the TESA-7475 tape was detached, and the end portion of the tape was pulled at an angle of 180° relative to the polyester film. A force required to peel the tape at a peeling speed of 0.3 m/min, hereinafter referred to as "release force A", N/25 mm, was determined.

As a blank, virgin TESA-7475 tape was attached to a polyester film and then as above, pressed by rolling back and forth a roller of 2 kg once. The assembly was allowed to stand for 30 minutes, an end of the TESA-7475 tape was detached, and the end portion of the tape was pulled at an angle of 180° relative to the polyester film. A force required to peel the tape at a peeling speed of 0.3 m/min, hereinafter referred to as "release force B", N/25 mm, was determined.

A residual adhesion rate (%) was determined by calculating the following formulas:

$$(\text{value of release force } A)/(\text{value of release force } B) \times 100$$

Curability

The metal roll of the tester was coated with each of the organopolysiloxane compositions. The organopolysiloxane composition was uniformly stretched by rotating two rolls (metal and rubber rolls) in contact for 45 seconds, and then transferred from the rubber roll to glassine paper made in Korea. The polyethylene-laminated paper having the organopolysiloxane composition transferred thereto was heated in a hot air dryer at 120° C. for 30 seconds to obtain a release paper bearing a cured film having a thickness of 0.9 to 1.1 g/m². Immediately after the release paper was taken out of the dryer, the cured film on its surface was intensely rubbed with a forefinger 10 times, red marker ink applied to the film surface, and the ink concentration and the cured film state were observed.

The results were evaluated according to the following indexes and shown in Tables 2 to 4.

When the finger mark was clearly confirmed, the film was evaluated "Poor".

When the finger mark was slightly confirmed, the film was evaluated "Fair".

When the finger mark was scarcely confirmed, the film was evaluated "Good".

A polyethylene terephthalate film having a thickness of 36 μm was laid on the surface of the cured film of the organopolysiloxane composition which was formed on the surface of glassine paper as the same manner as in the evaluation of the release force and, then, press bonded at room temperature under a pressure of 0.98 MPa for 20 hours. Thereafter, the polyethylene terephthalate film was detached from the cured film. Oily ink (tradename: Magic Ink ex Teranishi Chemical Industry Co., Ltd.) was applied to the detached surface which was contacted with the cured film of the polyethylene terephthalate film and silicone migration was evaluated in terms of ink cissing. The results were evaluated according to the following indexes and shown in Tables 2 to 4.

When the surface had no ink cissing (no or little silicone migration), the film was evaluated "Good".

When the surface had ink cissing (noticeable silicone migration), the film was evaluated "Poor".

Adhesion

The organopolysiloxane composition was transferred on the surface of glassine paper as the same manner as in the evaluation of the curability described above, which was heated in a hot air dryer at 120° C. for 30 seconds to obtain a release paper. After this release paper was stored in a constant temperature/humidity apparatus at 60° C. and 90% RH for one day, in the same way as in the evaluation of the curability, the cured film on its surface was intensely rubbed with a forefinger 10 times, red marker ink applied to the film surface, and the ink concentration and the cured film state were observed.

The results were evaluated according to the following indexes and shown in Tables 2 to 4.

When the finger mark was clearly confirmed, the film was evaluated "Poor".

When the finger mark was slightly confirmed, the film was evaluated "Fair".

When the finger mark was scarcely confirmed, the film was evaluated "Good".

TABLE 1

| Component, part by mass | | Ex. 1 | Ex. 2 | Ex. 3 | Ex. 4 | Ex. 5 | Ex. 6 | Ex. 7 | Ex. 8 | Ref. Ex.1 |
|---|---|---|---|---|---|---|---|---|---|---|
| (A) | Methyl polysiloxane (1) | 100 | | | | | | | 100 | |
| | Methyl polysiloxane (2) | | 100 | | | | | | | |
| | Methyl polysiloxane (3) | | | 100 | | | 50 | | | |
| | Methyl polysiloxane (4) | | | | 100 | | | | | |
| | Methyl polysiloxane (5) | | | | | 100 | | | | |
| | Methyl polysiloxane (6) | | | | | | | 100 | | |
| Methyl polysiloxane containing vinyl groups at both ends (8) | | | | | | | 50 | | | 100 |
| (B) | Methylhydrogen-polysiloxane | 1.97 | 1.97 | 1.97 | 2.87 | 1.64 | 1.51 | 1.97 | 1.97 | 1.97 |
| (C) | Platinum-vinylsiloxane complex | 0.8 | 0.8 | 0.8 | 0.8 | 0.8 | 0.8 | 0.8 | 0.6 | 4.0 |

TABLE 1-continued

| Component, part by mass | | Ex. 1 | Ex. 2 | Ex. 3 | Ex. 4 | Ex. 5 | Ex. 6 | Ex. 7 | Ex. 8 | Ref. Ex.1 |
|---|---|---|---|---|---|---|---|---|---|---|
| (D) | 1-ethynyl-1-cyclohexanol | 0.3 | 0.3 | 0.3 | 0.3 | 0.3 | 0.3 | 0.3 | 0.3 | 0.3 |
| Platinum amount, ppm by mass | | 20 | 20 | 20 | 20 | 20 | 20 | 20 | 15 | 100 |
| H/Vi | | 1.8 | 1.8 | 1.8 | 1.8 | 1.8 | 1.8 | 1.8 | 1.8 | 1.8 |
| Release properties | Release force (N/25 mm) @ 25° C., 70 g/cm², 24 hrs | 0.15 | 0.13 | 0.12 | 0.15 | 0.15 | 0.15 | 0.22 | 0.12 | 0.13 |
| | Release force (N/25 mm) @70° C., 20 g/cm², 24 hrs | 0.29 | 0.25 | 0.26 | 0.21 | 0.28 | 0.27 | 0.38 | 0.28 | 0.27 |
| | Residual adhesion rate (%) @25° C., 70 g/cm², 24 hrs | 92 | 97 | 96 | 97 | 95 | 92 | 90 | 91 | 97 |
| | Residual adhesion rate (%) @70° C., 20 g/cm², 24 hrs | 90 | 96 | 94 | 96 | 92 | 90 | 89 | 87 | 96 |
| | Curability | Good | Good | Good | Good | Good | Good | Good | Good | Good |
| | Silicone migration | Good | Good | Good | Good | Good | Good | Good | Good | Good |
| | Adhesion | Good | Good | Good | Good | Good | Good | Good | Good | Good |

TABLE 2

| Component, parts by mass | | Comparative Example 1 | Comparative Example 2 | Comparative Example 3 | Comparative Example 4 |
|---|---|---|---|---|---|
| Methyl polysiloxane containing vinyl groups at both ends (8) | | 100 | | 100 | 100 |
| (B) | Methylhydrogenpolysiloxane | 1.97 | 1.71 | 1.97 | 1.97 |
| (C) | Platinum-vinylsiloxane complex | 0.8 | 0.8 | 0.8 | 0.8 |
| (D) | 1-ethynyl-1-cyclohexanol | 0.3 | 0.3 | 0.3 | 0.3 |
| | Methyl polysiloxane containing vinyl groups at both ends (9) | | 100 | | |
| | $M^{A2}D_5$ (10) | | | 1 | |
| | Acrylic acid (11) | | | | 1 |
| Platinum amount, ppm by mass | | 20 | 20 | 20 | 20 |
| H/Vi | | 1.8 | 1.8 | 1.8 | 1.8 |
| Release properties | Release force (N/25 mm) @ 25° C., 70 g/cm², 24 hrs | 0.35 | 0.44 | 0.34 | 0.48 |
| | Release force (N/25 mm) @70° C., 20 g/cm², 24 hrs | 0.63 | 0.86 | 0.58 | 0.94 |
| | Residual adhesion rate (%) @25° C., 70 g/cm², 24 hrs | 85 | 82 | 84 | 80 |
| | Residual adhesion rate (%) @70° C., 20 g/cm², 24 hrs | 81 | 79 | 81 | 77 |
| | Curability | Poor | Poor | Poor | Poor |
| | Silicone migration | Poor | Poor | Poor | Poor |
| | Adhesion | Poor | Poor | Poor | Poor |

As shown in the Table 1, Reference Example 1 is an addition-curable organopolysiloxane composition of the prior art, wherein the platinum amount of catalyst (C) is as high as 100 ppm by weight. Since the cure reaction proceeded sufficiently, this composition shows good curability, silicone migration, and adhesion and has satisfactory release properties such as a low release force and a high residual adhesion rate.

Comparative Example 1 has the formulation wherein the platinum concentration of catalyst (C) is changed to 20 ppm by weight in the formulation of Reference Example 1. In this case, the organopolysiloxane composition did not cure by the heat treatment at 120° C. for 30 seconds, and remained oily. That is, the cure was insufficient. Even after separator aging at 25° C. for one day, the cure was still insufficient, and noticeable finger marks were left after the coating surface was rubbed. Furthermore, the amount of migrated silicone was large, so that the curability and silicone migration were inferior.

As shown in Table 2, Comparative Examples 3 and 4 are compositions obtained by blending the siloxane having acrylic groups at both ends (10) or 1 part by weight of acrylic acid with the composition of Comparative Example 1. The compositions contained the siloxane having acrylic groups or the acrylic acid, but were inferior in curability and adhesion, and had inferior silicone migration equivalent to that of Comparative Example 1. The release force was large as compared with those of Reference Example 1, and the residual adhesion rates were low. Comparative Example 2 is a composition obtained by blending 100 parts by mass of the methyl polysiloxane having vinyl groups at both ends and acrylic groups on side chains (9). The siloxane has 10, as an average, acrylic groups per molecule. Although the composition contained the siloxane having vinyl groups and acrylic groups, the curability and adhesion were inferior and the silicone migration was as inferior as that of Comparative Example 1. The release force was large as compared with that of Reference Example 1, and the residual adhesion rate was low.

In contrast, as shown in Table 1, Examples 1 to 8 are organopolysiloxane compositions comprising methyl polysiloxanes having vinyl groups at both ends and specific amounts of acrylic groups on side chains. The composition of Examples 1 to 8 were sufficiently cured with the organopolysiloxanes having vinyl groups and having specific amounts of acrylic groups or methacrylic groups as component (A), despite a minor platinum concentration of catalyst (C). Therefore, few finger marks are left after the coating surface of the cured film are rubbed, and the amounts of silicone migration are small. The release forces and residual adhesion rates are comparable to those of Reference Example 1. Therefore, on account of component (A) of the present invention, the curability of the composition is enhanced and, thereby, the addition reaction proceed at a low platinum amount.

In particular, methyl polysiloxane (3) used in Example 3 has 220 of D units and contains 2.5 of siloxane units having acrylic groups. Methyl polysiloxane (5) used in Example 5 has the same molecular weight as that of methyl polysiloxane (2) and has two vinyl groups on side chains. Even with the formulation including such methyl polysiloxanes, the curability and adhesion are satisfactory. The composition of Example 6 comprises both the methyl polysiloxane having acrylic groups and vinyl groups (3) and the methyl polysiloxane having vinyl groups but no acrylic group (8). In this composition, the curability is satisfactory, and the amount of silicone migration is small. Further, the release force and residual adhesion rate are comparable to those of Reference Example 1. Therefore, even in the formulation comprising a conventional organopolysiloxane having vinyl groups, the addition reaction proceeds sufficiently with a small amount of platinum catalyst by comprising the present component (A).

That is, the composition comprising the present component (A) provides good curability and release properties equivalent to those in the case of curing at a platinum amount of 100 ppm by weight, even when the composition comprises the platinum group metal catalyst (C) in a small amount such as a low platinum amount of less than 100 ppm by weight.

The organopolysiloxane composition of the present invention is sufficiently cured with a minor amount of platinum group metal catalyst and forms a cured film having a release force comparable to addition type compositions of the prior art, and it is preferable as a composition that provides a cured film for release paper and release film. The organopolysiloxane composition of the present invention cures even under conditions that hinder curing in the prior art and allows significantly reducing manufacturing costs because of a minor amount of platinum group metal catalyst. Further, curing via an addition reaction is conducted even on a substrate comprising a catalyst poison.

The invention claimed is:

1. An addition-curable organopolysiloxane composition comprising the following components (A) to (C):

(A) an organopolysiloxane having two or more alkenyl groups each bonded to a silicon atom per molecule and having 0.01 to 1.0, as an average, (meth) acrylic groups, (B) an organohydrogenpolysiloxane having two or more hydrogen atoms each bonded to a silicon atom (i.e., Si—H group) per molecule in such an amount that a ratio of the number of Si-H groups in component (B) to the number of alkenyl groups in component (A) is 1 to 5, and (C) a platinum group metal catalyst in an amount that a platinum group metal amount is 1 to 100 ppm by mass based on a total mass of the composition.

2. The addition-curable organopolysiloxane composition according to claim 1, further comprising 0.01 to 5 parts by mass of (D) a reaction inhibitor, relative to 100 parts by mass of component (A).

3. The addition-curable organopolysiloxane composition according to claim 1, wherein component (A) has a weight average molecular weight of 3,000 to 300,000.

4. The addition-curable organopolysiloxane composition according to claim 1, wherein component (A) has the (meth) acrylic group on a side chain.

5. The addition-curable organopolysiloxane composition according to claim 1, wherein the amount of component (C) is an amount that a platinum group metal amount is 5 to 40 ppm by mass, based on the total mass of the composition.

6. The addition-curable organopolysiloxane composition according to claim 1, the addition-curable organopolysiloxane composition being for release paper or release film.

7. A release paper having a cured film consisting of a cured product of the addition-curable organopolysiloxane composition according to claim 1.

8. A release film having a cured film consisting of a cured product of the addition-curable organopolysiloxane composition according to claim 1.

9. The addition-curable organopolysiloxane composition according to claim 2, wherein component (A) has a weight average molecular weight of 3,000 to 300,000.

10. The addition-curable organopolysiloxane composition according to claim 2, wherein component (A) has the (meth) acrylic group on a side chain.

11. The addition-curable organopolysiloxane composition according to claim 2, wherein the amount of component (C) is an amount that a platinum group metal amount is 5 to 40 ppm by mass, based on the total mass of the composition.

12. A release paper having a cured film consisting of a cured product of the addition-curable organopolysiloxane composition according to claim 2.

13. A release paper having a cured film consisting of a cured product of the addition-curable organopolysiloxane composition according to claim 3.

14. A release paper having a cured film consisting of a cured product of the addition-curable organopolysiloxane composition according to claim 4.

15. A release paper having a cured film consisting of a cured product of the addition-curable organopolysiloxane composition according to claim 5.

16. A release film having a cured film consisting of a cured product of the addition-curable organopolysiloxane composition according to claim 2.

17. A release film having a cured film consisting of a cured product of the addition-curable organopolysiloxane composition according to claim 3.

18. The addition-curable organopolysiloxane composition according to claim 1, wherein component (A) is represented by the following average formula (1):

$$(R_3SiO_{1/2})_a(R_2PSiO_{1/2})_b(R_2ASiO_{1/2})_c(R_2SiO_{2/2})_d(RPSiO_{2/2})_e(RASiO_{2/2})_f(RSiO_{3/2})_g(PSiO_{3/2})_h(ASiO_{3/2})_i(SiO_{4/2})_j \quad (1)$$

wherein R is, independently of each other, a substituted or unsubstituted monovalent hydrocarbon group having 1 to 12 carbon atoms, which has no aliphatic unsaturation, P is an alkenyl group represented by the formula: $-(CH_2)_n-CH=CH_2$ wherein n is 0 or a positive number of 0 to 6, A is a (meth) acrylic group-containing group represented by the formula: $CH_2=CR^2COR^3-$, $R^2$ is a hydrogen atom or a methyl group, $R^3$ is a divalent group that is $OR^4$ or $R^4$, and $R^4$ is a divalent organic group having 1 to 20 carbon atoms which may have a branched or cyclic structure and may contain an epoxy group, an ester bond, an urethane bond, an ether bond, an isocyanate bond, or a hydroxy group, a, b, c, e, h, i, and f are, independently of each other, 0 or a positive number, b, e, and n are not 0 at the same time and satisfy the equation $2 \leq b+e+h \leq 300$, dis a positive number of 50 to 4,000, g is 0 or a positive number of 0 to 50, j is 0 or a positive number of 0 to 50, c, f, and i are not 0 at the same time and satisfy the equation $0.01 \leq c+f+i \leq 1.0$.

19. A release paper having a cured film consisting of a cured product of the addition-curable organopolysiloxane composition according to claim 18.

20. A release film having a cured film consisting of a cured product of the addition-curable organopolysiloxane composition according to claim 18.

\* \* \* \* \*